(12) United States Patent
Tummala et al.

(10) Patent No.: US 11,522,949 B1
(45) Date of Patent: Dec. 6, 2022

(54) SYSTEMS AND METHODS FOR CLOUD-BASED HYBRID SERVICE MESHES IN MICROSERVICE ARCHITECTURES

(71) Applicant: JPMORGAN CHASE BANK, N.A., New York, NY (US)

(72) Inventors: Narayana Tummala, Fulshear, TX (US); Marco Pistoia, Amawalk, NY (US); Andrew Feig, Melville, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/455,799

(22) Filed: Nov. 19, 2021

(51) Int. Cl.
| | | |
|---|---|---|
| *H04L 29/06* | (2006.01) | |
| *H04L 29/08* | (2006.01) | |
| *H04L 12/24* | (2006.01) | |
| *H04L 12/26* | (2006.01) | |
| *H04L 67/1012* | (2022.01) | |
| *H04L 67/02* | (2022.01) | |
| *H04L 45/42* | (2022.01) | |
| *H04L 45/12* | (2022.01) | |
| *H04L 67/51* | (2022.01) | |
| *G06F 15/16* | (2006.01) | |
| *G06F 9/50* | (2006.01) | |
| *G06F 11/36* | (2006.01) | |
| *G06F 11/30* | (2006.01) | |

(52) U.S. Cl.
CPC ........ *H04L 67/1012* (2013.01); *H04L 45/123* (2013.01); *H04L 45/42* (2013.01); *H04L 67/02* (2013.01); *H04L 67/51* (2022.05)

(58) Field of Classification Search
USPC ........................................... 709/231
See application file for complete search history.

(56) References Cited

U.S. PATENT DOCUMENTS

| | | | | |
|---|---|---|---|---|
| 2012/0259909 | A1* | 10/2012 | Bachelor | G06Q 10/067 709/201 |
| 2016/0124742 | A1* | 5/2016 | Rangasamy | G06F 8/30 717/103 |
| 2018/0254996 | A1* | 9/2018 | Kairali | H04L 67/1036 |
| 2018/0276041 | A1* | 9/2018 | Bansal | G06F 11/30 |
| 2018/0285250 | A1* | 10/2018 | Helsley | G06F 11/3409 |
| 2018/0287876 | A1* | 10/2018 | Strobel | H04L 41/12 |
| 2020/0021505 | A1* | 1/2020 | Vinnakota | H04L 45/20 |
| 2020/0050494 | A1* | 2/2020 | Bartfai-Walcott | G06F 9/5083 |
| 2020/0120000 | A1* | 4/2020 | Parthasarathy | G06F 11/3428 |

(Continued)

*Primary Examiner* — Jude Jean Gilles
(74) *Attorney, Agent, or Firm* — Greenberg Traurig LLP (57) ABSTRACT

Systems and methods for cloud-based hybrid service meshes in microservice architectures are disclosed. A method for selection of a microservice in a cloud-based hybrid mesh microservice architecture may include: (1) receiving, at a hybrid service mesh library in a first microservice instance, a request for a second microservice, wherein the hybrid service mesh library comprises microservice information for a plurality of microservice instances comprising an identification of each microservice instance, a location for each microservice instance, and a status for each microservice instance; (2) identifying, by the hybrid service mesh library, a number of microservice instances for the microservice and the location of each microservice instance; (3) selecting, by the hybrid service mesh library, one of the plurality of microservice instances; and (4) calling, by the hybrid service mesh library, the selected microservice instance.

20 Claims, 3 Drawing Sheets

(56) References Cited

U.S. PATENT DOCUMENTS

2020/0259715 A1* 8/2020 Schermann ............. H04L 67/51
2020/0372576 A1* 11/2020 Sundaram ........... G06F 21/6245
2021/0133015 A1* 5/2021 Agarwal ................ G06F 11/36

* cited by examiner

SYSTEMS AND METHODS FOR CLOUD-BASED HYBRID SERVICE MESHES IN MICROSERVICE ARCHITECTURES

BACKGROUND OF THE INVENTION

1. Field of the Invention

Embodiments are generally related to systems and methods for cloud-based hybrid service meshes in microservice architectures.

2. Description of the Related Art

Teams are migrating pieces of monolith services from Virtual Server Interface (VSI)/Physical Server Interface (PSI) to cloud platforms, resulting in hybrid platform applications. Cloud-based architectures rely on many common services, such as service discovery, load balancing, resiliency testing, non-disruptive upgrades, etc. Because of this, application development teams must learn, build, configure, deploy, and maintain these services individually. This additional work delays the deployment of an application.

SUMMARY OF THE INVENTION

Systems and methods for cloud-based hybrid service meshes in microservice architectures are disclosed. In one embodiment, a method for registration of microservice instances in a distributed cloud platform network may include: (1) receiving, at each managed node of a plurality of managed nodes in the distributed cloud platform network, each managed node associated with a cloud platform, microservice information from a plurality of microservice instances hosted by the associated cloud platform; (2) aggregating, by each managed node, the microservice information; (3) communicating, by each managed node, the aggregated microservice information to the other managed nodes in the distributed cloud platform network; (4) combining, by each managed node, the received microservice information with its aggregated microservice information; and (5) integrating, by an application in the distributed cloud platform network, the combined microservice information into a hybrid service mesh library.

In one embodiment, the microservice information for each microservice instance may include a microservice instance identifier, a host identifier for the host cloud platform, and a status of the microservice instance.

In one embodiment, the microservice information may be periodically updated.

In one embodiment, the hybrid service mesh library may be configurable to route traffic to one of the plurality of microservice instances.

According to another embodiment, a method for selection of a microservice in a cloud-based hybrid mesh microservice architecture may include: (1) receiving, at a hybrid service mesh library in a first microservice instance, a request for a second microservice, wherein the hybrid service mesh library comprises microservice information for a plurality of microservice instances comprising an identification of each microservice instance, a location for each microservice instance, and a status for each microservice instance; (2) identifying, by the hybrid service mesh library, a number of microservice instances for the microservice and the location of each microservice instance; (3) selecting, by the hybrid service mesh library, one of the plurality of microservice instances; and (4) calling, by the hybrid service mesh library, the selected microservice instance.

In one embodiment, the hybrid service mesh library may select the selected microservice instance to balance a load across the plurality of microservice instances, a geographical proximity of the location of the selected microservice instance, to minimize latency, etc.

In one embodiment, the hybrid service mesh library may be configurable to route traffic to one of the plurality of microservice instances.

In one embodiment, the microservice information for one of the microservice instances may be updated when the microservice instance comes online or goes offline.

In one embodiment, the selected microservice instance is executed by a cloud platform associated with one of a plurality of managed nodes in a distributed cloud platform network.

In one embodiment, each of the plurality of managed nodes in the distributed cloud platform network is associated with a cloud platform.

In one embodiment, the plurality of managed nodes may aggregate the microservice information for the microservice instances hosted by the associated cloud platform.

In one embodiment, the plurality of managed nodes share aggregated microservice information with other managed nodes.

According to another embodiment, a distributed cloud platform network may include a plurality of managed nodes, each managed node associated with a cloud platform; a plurality of microservice instances hosted by each cloud platform; and a microservice comprising a hybrid service mesh library comprising microservice information for the plurality of microservice instances comprising an identification of each microservice instance, a location for each microservice instance, and a status for each microservice instance, wherein the hybrid service mesh library identifies a number of microservice instances for the microservice and the location of each microservice instance, selects one of the plurality of microservice instances, and calls the selected microservice instance.

In one embodiment, the hybrid service mesh library selects the selected microservice instance to balance a load across the plurality of microservice instances, based on a geographical proximity of the location of the selected microservice instance, to minimize latency, etc.

In one embodiment, the hybrid service mesh may be configurable to route traffic to one of the plurality of microservice instances.

In one embodiment, the plurality of managed nodes may share aggregated microservice information with other managed nodes.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for cloud-based hybrid service meshes in microservice architectures.

In embodiments, a managed service with a common reusable library that insulates developers from bespoke infrastructure details is disclosed. Embodiments simplify the development of cloud-based applications by seamlessly integrating and managing a set of common platform services. This promotes platform independence (e.g., write once, run anywhere), does not require configuration for common use cases, prevents duplication of effort, ensures standardization and consistency (e.g., no app-to-app variations), and instantiates architectures based on best practices.

Embodiments may provide at least some of the following advantages: (1) lower costs; (2) a reduction in the amount of human touch time required to setup common services; (3) a reduction in manual errors; (4) faster deployment; (5) consolidates solutions to common services that work for multiple applications, such as resiliency, load-balancing, logging, non-disruptive upgrades, etc.; (6) provides better control (e.g., allows implementation and modification of business processes, policies, and controls); (7) encourages greater unity and collaboration between application development and operations teams; (8) provides stable environments that increase productivity; and (9) reduces operational dependencies during upgrades and deployments.

Embodiments may provide a dynamic platform that may reduce or eliminate health checks, may provide configuration management, may provide gap pool maintenance, may optimize utilization of resources, may provide for horizontal scaling, may provide geo-affinity load balancing configurations, may use common features, such as leader election, unique identifier generation, feature flags, etc.; may provide failure detection and/or propagation with an upper bound, may require minimal network traffic, and may provide support for multiple programming languages. For example, embodiments may facilitate distributed agreement services, such leader election, unique identifier generation, etc. by virtue of having a dynamic registration of microservice instances.

As used herein, "microservice" refers to any service that is independently deployable, loosely coupled, highly maintainable, and testable. Copies of microservices may deployed to different cloud platforms as microservice instances.

Figure 1:
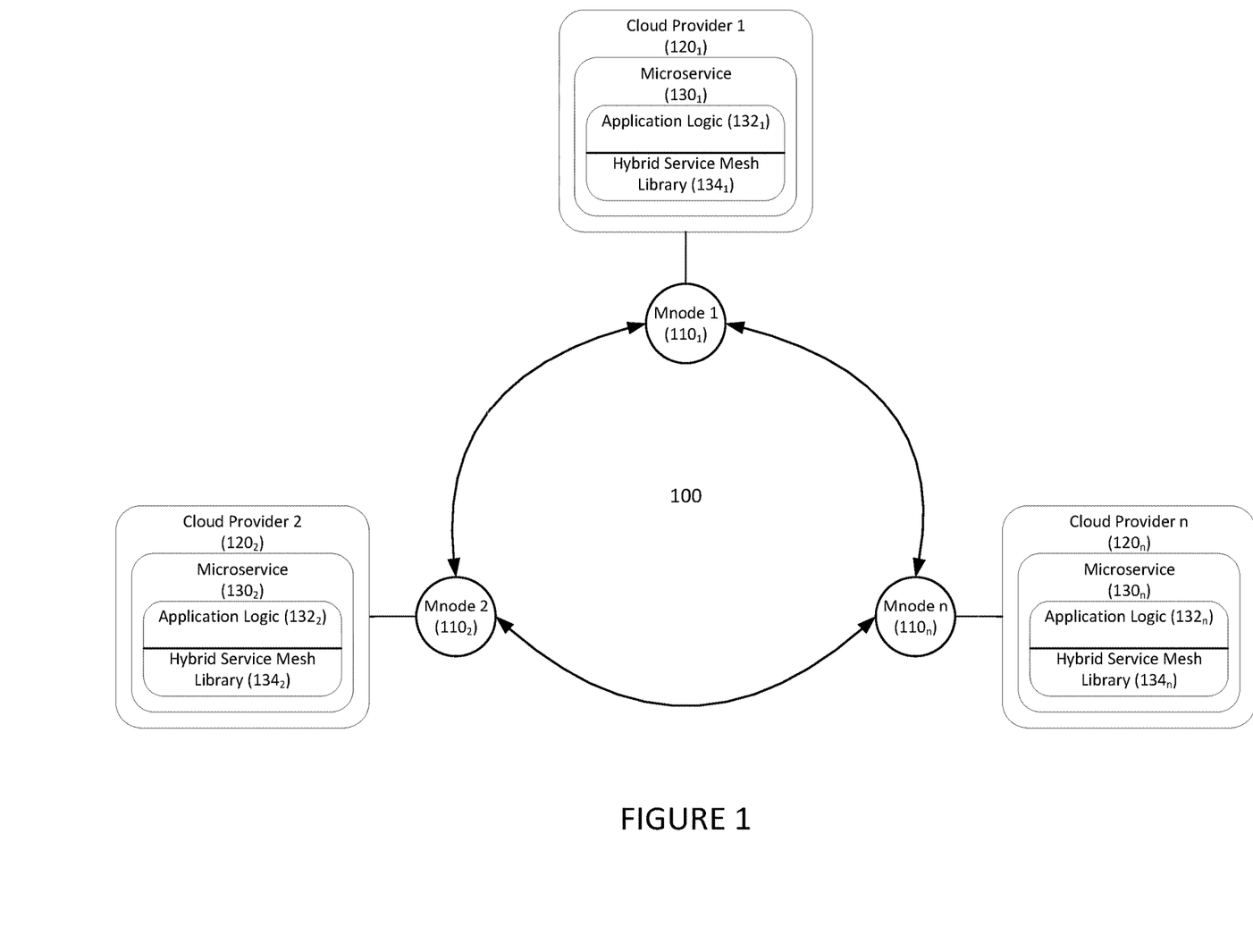
FIG. 1 depicts a cloud-based hybrid mesh microservice architecture according to an embodiment.

Referring to FIG. 1, a cloud-based hybrid mesh microservice architecture is illustrated according to one embodiment. Distributed cloud platform network 100 may be cluster for one or more microservices that may include a plurality of cloud providers, such as cloud provider 1 120$_1$, cloud provider 2 120$_2$, and cloud provider n 120$_n$. Each cloud provider may host one microservice instance (e.g., 130$_1$, 130$_2$, . . . 130$_n$), for example, a separate deployment of each microservice, and may interface with the other cloud providers using nodes 110$_1$, 110$_2$, . . . 110$_n$, such as managed nodes or "MNodes."

MNodes 110 may be provided by the distributed cloud platform network 100 and are not part of an application or microservice.

Although each cloud provider 120 may host a plurality of microservices 130, FIG. 1 depicts a single microservice (e.g., 130$_1$, 130$_2$, . . . 130$_n$) hosted by each cloud provider 120. Microservices 130 may perform the same functions, different functions, etc.

Each microservice (e.g., 130$_1$, 130$_2$, . . . 130$_n$) may include application logic (e.g., 132$_1$, 132$_2$, . . . 132$_n$) and hybrid service mesh library (e.g., 134$_1$, 134$_2$, . . . 134$_n$). Application logic 132 may include the logic required for each microservice 130 to execute.

Hybrid service mesh library 134 may include microservice information on registered instances of microservices 130 at all cloud providers 120. For example, hybrid service mesh library 134 may aggregate microservice information from each MNode 110 and may maintain a library of the microservice information. Examples of microservice information include a microservice instance identifier (e.g., any identifier that uniquely identifies a microservice instance), a host identifier for the host cloud platform (e.g., any identifier that uniquely identifies the host cloud platform for the microservice instance) or location of the microservice instance, and a status of the microservice instance.

In embodiment, each microservice (e.g., 130$_1$, 130$_2$, . . . 130$_n$) may automatically register its service with its local MNode 110$_1$, 110$_2$, . . . 110$_n$. Each MNode 110$_1$, 110$_2$, . . . 110$_n$ may communicate its data to all other MNodes in the service cluster. Each hybrid service mesh library 134 may be periodically updated.

Cloud provider 1 120$_k$, cloud provider 2 120$_2$, and cloud provider n 120$_n$ may be different cloud platforms, may be different instances of the same cloud platform, etc. Examples of cloud platforms include the AMAZON WEB SERVICES platform, the GOOGLE CLOUD platform, MICROSOFT AZURE platform, etc.

Embodiments effectively provide a control plane including hybrid service mesh libraries 134 and MNodes 110.

The availability status and configuration preferences for each microservice 130 may be retrieved using lookups. For example, hybrid service mesh libraries 134 may look up a status and a location (e.g., a host) for each microservice 130.

In embodiment, microservices 130 may join client-server preferences when making routing and policy decisions.

Microservices 130 may use non-local MNodes 110 in the cluster as fallbacks when a local MNode 110 is unreachable.

A user interface (not shown) may be provided to enable configuration of hybrid service mesh libraries 134. For example, a user may configure hybrid service mesh libraries 134 to route traffic to one or more microservice 130 for testing, canary deployment, etc.

Figure 2:
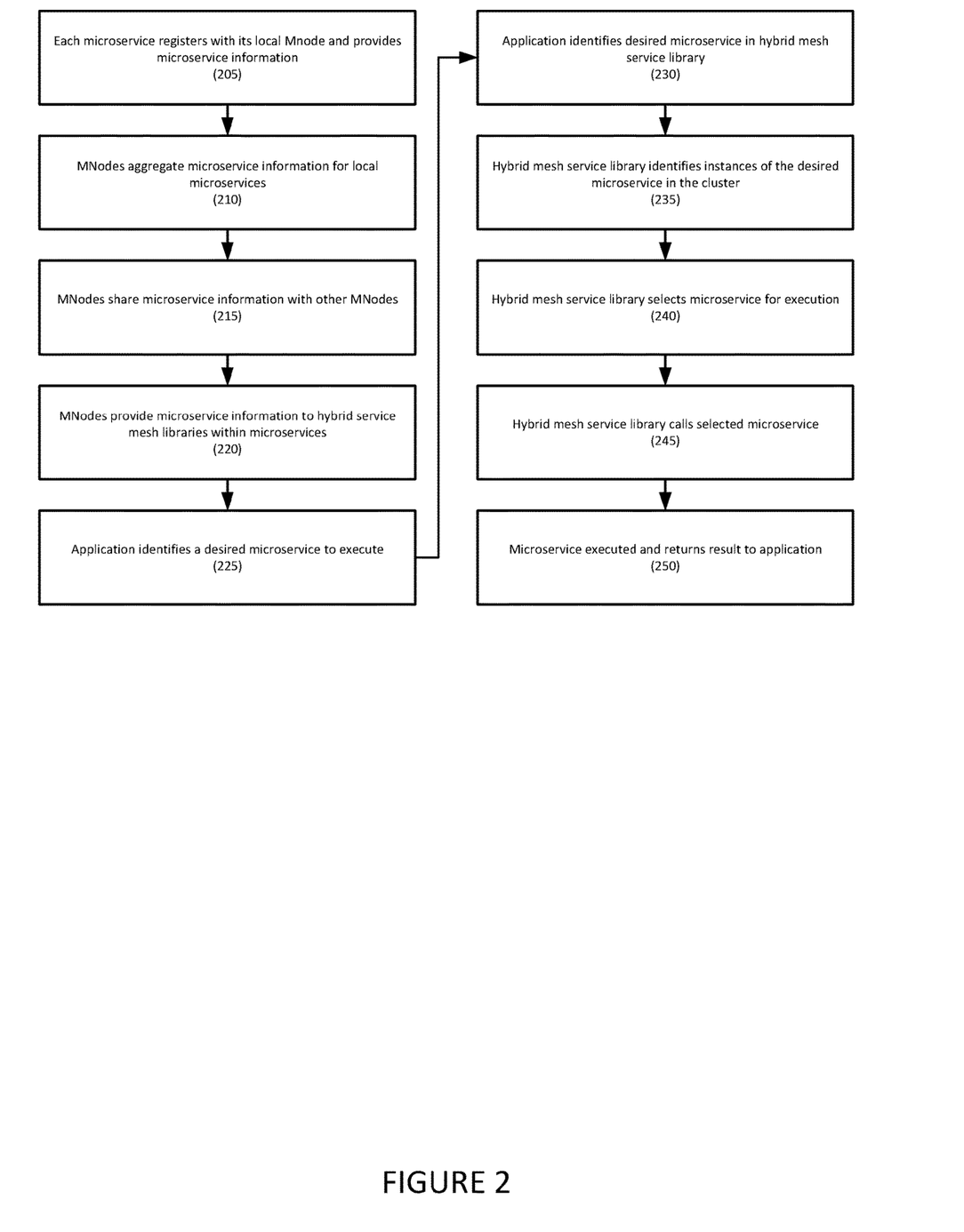
FIG. 2 depicts a method for cloud-based hybrid service meshes in microservice architectures according to an embodiment.

Referring to FIG. 2, an exemplary method for using cloud-based hybrid service meshes in microservice architectures is disclosed according to an embodiment.

In step 205, upon start up, each microservice may register with its local MNode. In one embodiment, the microservice may provide microservice information, such as a microservice identifier, a location (e.g., a host), and a status to its local MNode.

In step 210, the MNodes may aggregate the microservice information for their local microservices and, in step 215, may share the information with other MNodes in the cluster. The MNodes may combine the microservice information from the other MNodes with its aggregated microservice information.

In step 220, the MNodes may provide the microservice information to hybrid service mesh libraries within each microservice. The hybrid service mesh libraries may integrate the microservice information.

In step 225, in the course of execution, an microservice may identify a microservice to call. The microservice may be part of a process flow within the application.

In step 230, the application may identify instances of the desired microservice in the hybrid service mesh library.

In step 235, the hybrid service mesh library may identify the number of microservice instances for the desired microservice within the hybrid cloud platform network and the location of execution (e.g., a host) of each microservice instance.

In step 240, if more than one microservice instance is running, the hybrid service mesh library may select a microservice instance for load balancing. In another embodiment, the hybrid service mesh library may select the microservice instance that minimizes latency. In another embodiment, the hybrid service mesh library may select the microservice instance based on geographic affinity. Combinations of these considerations may be used as is necessary and/or desired.

In one embodiment, the hybrid service mesh library may be configurable to route traffic to one or more microservice instance for canary deployment A-B testing, etc.

In step 245, the hybrid service mesh library may call the selected microservice instance, and in step 250, the microservice instance may return results to the application. The process may be repeated for the next identified microservice.

Figure 3:
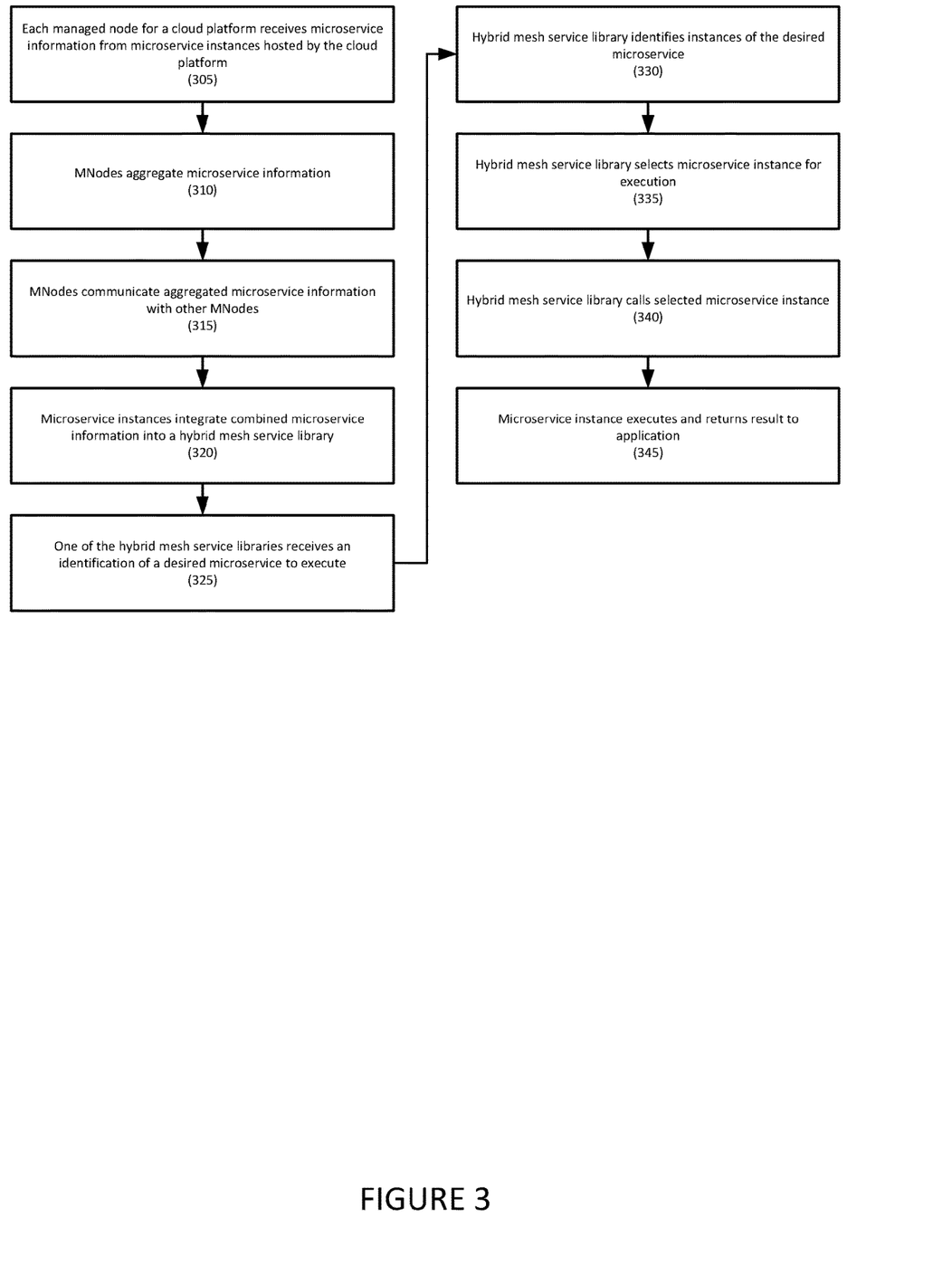
FIG. 3 depicts a method for cloud-based hybrid service meshes in microservice architectures according to another embodiment.

Referring to FIG. 3, an exemplary method for using cloud-based hybrid service meshes in microservice architectures is disclosed according to another embodiment.

In step 305, upon start up, each managed node (MNode) for a cloud platform in a hybrid mesh microservice network may receive microservice information from microservice instances hosted by their respective cloud platforms. In one embodiment, the microservice information may include a microservice instance identifier, a location of the microservice instance (e.g., a host identifier), and a status.

In step 310, the MNodes may aggregate the microservice information for their local microservice instances and, in step 315, may share the aggregated microservice information with other MNodes. The MNodes may combine the microservice information received from the other MNodes with its aggregated microservice information.

In step 320, the microservice instances may receive the aggregated microservice information from their MNodes and may integrate the aggregated microservice information to hybrid service mesh libraries within each microservice instance.

In step 325, in the course of execution, one of the hybrid service mesh libraries may receive a microservice to call. The identification may be from an application or from an external process.

In step 330, the hybrid service mesh library may identify instances of the desired microservice in the hybrid service mesh library. For example, it may identify the number of instances of the desired microservice within the cluster and the location of execution (e.g., a host cloud platform) of each desired microservice.

In step 335, if more than one microservice instance is running, the hybrid service mesh library may select one of the microservice instances for load balancing. In another embodiment, the hybrid service mesh library may select the microservice instance that minimizes latency. In another embodiment, the hybrid service mesh library may select the microservice instance based on geographic affinity. Combinations of these considerations may be used as is necessary and/or desired.

In one embodiment, the hybrid service mesh library may be configurable to route traffic to one or more specific microservice instances. This may be useful for canary deployment, A-B testing, etc. In one embodiment, the hybrid service mesh library may configured using a user interface.

In step 340, the hybrid service mesh library may call the selected microservice instance, and in step 345, the microservice instance may return results to the application. The process may be repeated for the next microservice identified.

Embodiments may be used to perform some or all of the following use cases: calling a specific version of a microservice, automated enablement/disablement of cloud microservices, migrating microservices to another platform, deploying hybrid platforms, interacting with multiple service versions, "canary" deployment (e.g., gradual release), A-B testing (e.g., testing a new version of a microservice instance), configuration management, centralized metrics, distributed tracing, centralized logging, etc.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. It is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for registration of microservice instances in a distributed cloud platform network, comprising:
   receiving, at each managed node of a plurality of managed nodes in the distributed cloud platform network, each managed node associated with a cloud platform, microservice information from a plurality of microservice instances hosted by the associated cloud platform;
   aggregating, by each managed node, the microservice information;
   communicating, by each managed node, the aggregated microservice information to the other managed nodes in the distributed cloud platform network;
   combining, by each managed node, the received microservice information with its aggregated microservice information; and
   integrating, by an application in the distributed cloud platform network, the combined microservice information into a hybrid service mesh library.

2. The method of claim 1, wherein the microservice information for each microservice instance comprises a microservice instance identifier, a host identifier for the host cloud platform, and a status of the microservice instance.

3. The method of claim 1, wherein the microservice information is periodically updated.

4. The method of claim 1, wherein the hybrid service mesh library is configurable to route traffic to one of the plurality of microservice instances.

5. A method for selection of a microservice in a cloud-based hybrid mesh microservice architecture, comprising:
   receiving, at a hybrid service mesh library in a first microservice instance, a request for a second microservice, wherein the hybrid service mesh library comprises microservice information for a plurality of microservice instances comprising an identification of each microservice instance, a location for each microservice instance, and a status for each microservice instance;
   identifying, by the hybrid service mesh library, a number of microservice instances for the microservice and the location of each microservice instance;
   selecting, by the hybrid service mesh library, one of the plurality of microservice instances; and
   calling, by the hybrid service mesh library, the selected microservice instance.

6. The method of claim 5, wherein the hybrid service mesh library selects the selected microservice instance to balance a load across the plurality of microservice instances.

7. The method of claim 5, wherein the hybrid service mesh library selects the selected microservice instance based on a geographical proximity of the location of the selected microservice instance.

8. The method of claim 5, wherein the hybrid service mesh library selects the selected microservice instance to minimize latency.

9. The method of claim 5, wherein the hybrid service mesh library is configurable to route traffic to one of the plurality of microservice instances.

10. The method of claim 5, wherein the microservice information for one of the microservice instances is updated when the microservice instance comes online or goes offline.

11. The method of claim 5, wherein the selected microservice instance is executed by a cloud platform associated with one of a plurality of managed nodes in a distributed cloud platform network.

12. The method of claim 11, wherein each of the plurality of managed nodes in the distributed cloud platform network is associated with a cloud platform.

13. The method of claim 12, wherein the plurality of managed nodes aggregate the microservice information for the microservice instances hosted by the associated cloud platform.

14. The method of claim 12, wherein the plurality of managed nodes share aggregated microservice information with other managed nodes.

15. A distributed cloud platform network, comprising:
   a plurality of managed nodes, each managed node associated with a cloud platform;
   a plurality of microservice instances hosted by each cloud platform; and
   a microservice comprising a hybrid service mesh library comprising microservice information for the plurality of microservice instances comprising an identification of each microservice instance, a location for each microservice instance, and a status for each microservice instance, wherein the hybrid service mesh library identifies a number of microservice instances for the microservice and the location of each microservice instance, selects one of the plurality of microservice instances, and calls the selected microservice instance.

16. The distributed cloud platform network of claim 15, wherein the hybrid service mesh library selects the selected microservice instance to balance a load across the plurality of microservice instances.

17. The distributed cloud platform network of claim 15, wherein the hybrid service mesh library selects the selected microservice instance based on a geographical proximity of the location of the selected microservice instance.

18. The distributed cloud platform network of claim 15, wherein the hybrid service mesh library selects the selected microservice instance to minimize latency.

19. The distributed cloud platform network of claim 15, wherein the hybrid service mesh library is configurable to route traffic to one of the plurality of microservice instances.

20. The distributed cloud platform network of claim 15, wherein the plurality of managed nodes share aggregated microservice information with other managed nodes.

* * * * *